US006617834B2

(12) United States Patent
Tran

(10) Patent No.: US 6,617,834 B2
(45) Date of Patent: Sep. 9, 2003

(54) SWITCHED POWER SUPPLY WITH VOLTAGE REGULATOR HAVING PWM WITH HYSTERETIC LOOP CONTROLLER AND METHOD FOR OPERATING AND USING SAME

(75) Inventor: Tuan Tran, Arvada, CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/953,535

(22) Filed: Sep. 11, 2001

(65) Prior Publication Data
US 2003/0048098 A1 Mar. 13, 2003

(51) Int. Cl.[7] .................................. G05F 1/40
(52) U.S. Cl. ....................... 323/288; 323/284
(58) Field of Search ................. 323/222, 242, 323/246, 268, 271, 282, 284, 288

(56) References Cited
U.S. PATENT DOCUMENTS 4,477,867 A * 10/1984 Pellgrino ..................... 363/26
4,941,076 A * 7/1990 Diaz ........................... 363/49
5,001,620 A * 3/1991 Smith ......................... 363/89
6,104,172 A * 8/2000 Josephs et al. ............. 323/222

OTHER PUBLICATIONS

UCC3588 5-Bit Programmable Output BiCMOS Power Supply Datasheet, Jul. 1999, p. 5.

* cited by examiner

Primary Examiner—Matthew V. Nguyen
(74) Attorney, Agent, or Firm—W. Daniel Swayze, Jr.; W. James Brady; Frederick J. Telecky, Jr.

(57) ABSTRACT

A switched power supply (40) has a pulse width modulator to adjust a pulse width that controls the output voltage (104). The width modulator includes a comparator (66) that compares a signal (104) indicating a value of the power supply to a ramp wave (69). An output of the comparator (66) is a signal containing a time width proportional to the output of the power supply. Additionally, a first comparator (90) compares the output voltage (42) to a first reference voltage (94). When the output voltage (42) exceeds the first reference voltage (94), the first comparator (90) changes state. A second comparator (88) compares the output voltage (42) to a second reference voltage (92). When the second reference voltage (92) exceeds the output voltage (42), the second comparator (88) changes state. The pulses are width modulated to first or second width limits in response to changes of output states of the first and second comparators.

9 Claims, 3 Drawing Sheets

SWITCHED POWER SUPPLY WITH VOLTAGE REGULATOR HAVING PWM WITH HYSTERETIC LOOP CONTROLLER AND METHOD FOR OPERATING AND USING SAME

BACKGROUND OF INVENTION

1. Field of Invention

This invention relates, in one aspect, to improvements in voltage regulator circuits and methods for operating same, and, in another aspect, to improvements in mass data storage devices, circuits, and methods, and more particularly to improvements in mass data storage devices, or the like, which include voltage regulator circuits, and methods for using and operating same.

2. Relevant Background

Applications for switched power supplies are manifold. Switched power supplies operate by alternately switching a current onto and away from a path that includes an inductor and a capacitor. The capacitor is connected to one end of the inductor, and sinks and sources the current therein so that as the current is switched, the capacitor maintains the voltage on the node to which it is connected. By controlling the switching time during which current is supplied to the capacitor, the voltage can be regulated to maintain a desired value within a quiescent operating range.

However if load variations disturb the current flow, charge on the capacitor is changed from its quiescent operating range. As a result, it may take an undesirably large amount of time for the power supply to restore the charge on the capacitor to within its quiescent range, and, consequently, to return the power supply to an operation within its quiescent output voltage range.

In the context of a mass data storage device, which is one of many environments in which the power supply and method of the invention may be employed, for example, a magneto-resistive (MR) data transducer or head may be used. The head may be biased by a biasing circuit that maintains a normal or quiescent current in the head (or a normal or quiescent voltage across the head). Such MR heads change resistance when they are moved through changing magnetic fields. As a result, as data, which is magnetically recorded on a magnetic media such as a spinning disk or the like, passes the MR head, the changes in resistance in the head can be detected and decoded to retrieve the data.

However, certain events, such as thermal asperities, may occur that cause large, abnormal transients in the resistance of the MR head. Sometimes, in fact, the MR head may actually undesirably contact a defect in the magnetic media, which may rapidly heat the MR head, and drastically change its resistance. This results in a rapid demand for current from the power supply to the head biasing circuit. On the other hand, sometimes the flight height of the head is significantly increased, such as if a dip were to occur in the magnetic disk above which the head flies. In this case, the head is unexpectedly cooled. This abnormally increases the resistance of the head, and reduces the demands on the power supply to the biasing circuit.

Also, when the circuit performs a read or write operation, the current demands of the DSP of the circuit are changed. The read operation in particular causes the DSP to perform a large amount of data processing. This large increase in processing requires that a large amount of current be supplied.

In either case, with regard to the power supply circuit, rapid changes occur to the charge on the output capacitor, which must be restored to within the quiescent range before the data can again be reliably detected. This restoration takes some time, depending on the size of the capacitor and inductor, and in the meantime, the data cannot be reliably detected.

What is needed, therefore, is a circuit and method for rapidly bringing the output voltage of a switched power supply to within its quiescent operating range after a disturbance. In the context of a mass data storage device, what is needed is a switched power supply of the type described that can rapidly reestablish its quiescent operating range after a disturbance to reduce the amount of time that data cannot be reliably detected.

SUMMARY OF INVENTION

In light of the above, therefore, it is an object of the invention to provide an improved voltage regulating power supply circuit and method for operating same.

It is another object of the invention to provide a voltage regulating power supply circuit of the type described and method for rapidly bringing the output voltage thereof to within its quiescent operating range after a disturbance.

It is another object of the invention to provide a mass data storage device that uses a voltage regulating power supply circuit of the type described that can rapidly reestablish its quiescent operating range after a disturbance to the data transducer to increase the amount of time that data can be reliably detected.

It is an advantage of the invention that the size of the capacitor used in a switched power supply can be reduced due to the capability of the supply circuit to rapidly recover from transients that pull the output voltage from a quiescent operating range.

It is another advantage of the invention that the circuit and method provide for duty cycle boost or reduction while a feedback loop is still in control of the output, and that this is performed while still keeping the fundamental switching frequency.

These and other objects, features, and advantages will become apparent to those skilled in the art from the following detailed description when read in conjunction with the accompanying drawing and appended claims.

According to a broad aspect of the invention, a switched power supply is presented. The supply has a switched circuit for producing an output voltage, and a circuit for generating pulse width modulated control pulses to control on and off times of the switched circuit to control a magnitude of the output voltage.

According to another broad aspect of the invention, a switched power supply is presented. The supply has a circuit for generating pulse width modulated control pulses to control its output voltage. A first comparator is connected to receive the output voltage on one input and a first reference voltage on another input. When the output voltage exceeds the first reference voltage, the output of the first comparator changes state. A second comparator is connected to receive the output voltage on one input and a second reference voltage on another input. When the second reference voltage exceeds the output voltage, the output of the second comparator changes state. A circuit is then provided changing the pulse width modulated pulses to first or second width limits in response to respective changes of the output states of the first and second comparators.

The circuit for generating pulse width modulated control pulses may include a comparator connected to receive a signal indicating an output voltage of the supply on one input, and a ramp wave signal from a ramp wave generator on another input. An output of the comparator is a signal containing a time width proportional to the output voltage of the supply.

According to yet another broad aspect of the invention, a method is provided for operating a switched power supply. The method includes generating pulse width modulated control pulses to control on and off times of current switches in the supply, and modifying a width of the pulse width modulated control pulses to control a magnitude of the output voltage of the supply. The method also includes, in another aspect, changing a width of the pulse width modulated pulses to a first or a second width limit in response to respective changes of the output voltage beyond first and second predetermined values.

According to still another broad aspect of the invention, a mass data storage device is presented. The mass data storage device includes a switched power supply that provides power to at least one element of the device. The supply includes a switched circuit for producing an output voltage, and a circuit for generating pulse width modulated control pulses to control on and off times of the switching elements to control a magnitude of the output voltage. The device may also include a circuit for changing a width of the pulse width modulated pulses to first or second width limits in response to respective changes of the output voltage beyond first and second predetermined values.

BRIEF DESCRIPTION OF DRAWINGS

The invention is illustrated in the accompanying drawings, in which.

In the various figures of the drawing, like reference numerals are used to denote like or similar parts. Also, like reference numerals are used to denote signal waveforms and the circuit lines or locations from which they are derived.

DETAILED DESCRIPTION OF A PREFERRED EMBODIMENT

Figure 1:
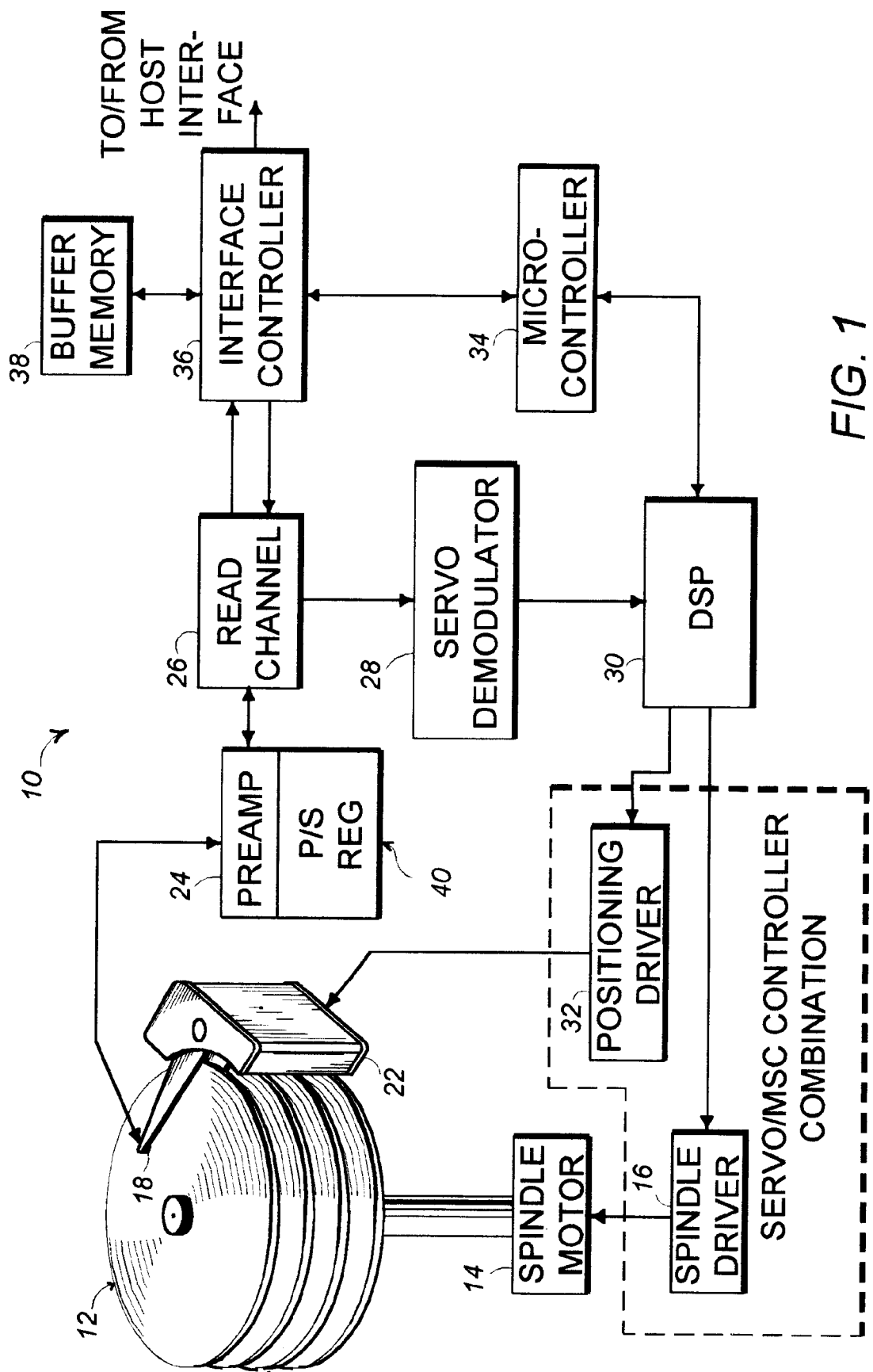
FIG. 1 is a block diagram of a generic disk drive system, illustrating a general environment in which the invention may be used.

FIG. 1 is a block diagram of a generic disk drive system 10, which represents a general environment in which the invention may be practiced. The system includes a magnetic media disk 12 that is rotated by a spindle motor 14 and spindle driver circuit 16. A data transducer or head 18 is locatable along selectable radial tracks (not shown) of the disk 12 by a voice coil motor 22. The head 18 may be a magneto-resistive (MR) head, but the environment is not limited thereto. The radial tracks may contain magnetic states that contain information about the tracks, such as track identification data, location information, synchronization data, as well as user data, and so forth. The head 18 is used both to record user data to and read user data back from the disk, as well as to detect signals that identify the tracks and sectors at which data is written, and to detect servo bursts that enable the head to be properly laterally aligned with the tracks of the disk.

Analog electrical signals that are generated by the head 18 in response to the magnetic signals recorded on the disk are preamplified by a preamplifier 24 for delivery to read channel circuitry 26. Servo signals are detected and demodulated by one or more servo demodulator circuits 28 and processed by a digital signal processor (DSP) 30 to control the position of the head 18 via the positioning driver circuit 32. The servo data that is read and processed may be analog data that is interpreted by the DSP 30 for positioning the head 18.

A microcontroller 34 is typically provided to control the DSP 30, as well as an interface controller 36 to enable data to be passed to and from a host interface (not shown) in known manner. A data memory 38 may be provided, if desired, to buffer data being written to and read from the disk 12.

A power supply and regulator 40, in accordance with a preferred embodiment of the invention, may be used to provide power at least to the preamplifier 24 of the mass data storage device 10 of FIG. 1. It should be noted that although the power supply 40 is described and illustrated in conjunction with a mass data storage device environment, it can be equally advantageously employed in other environments, as well, as will be apparent to those skilled in the art.

Figure 2:
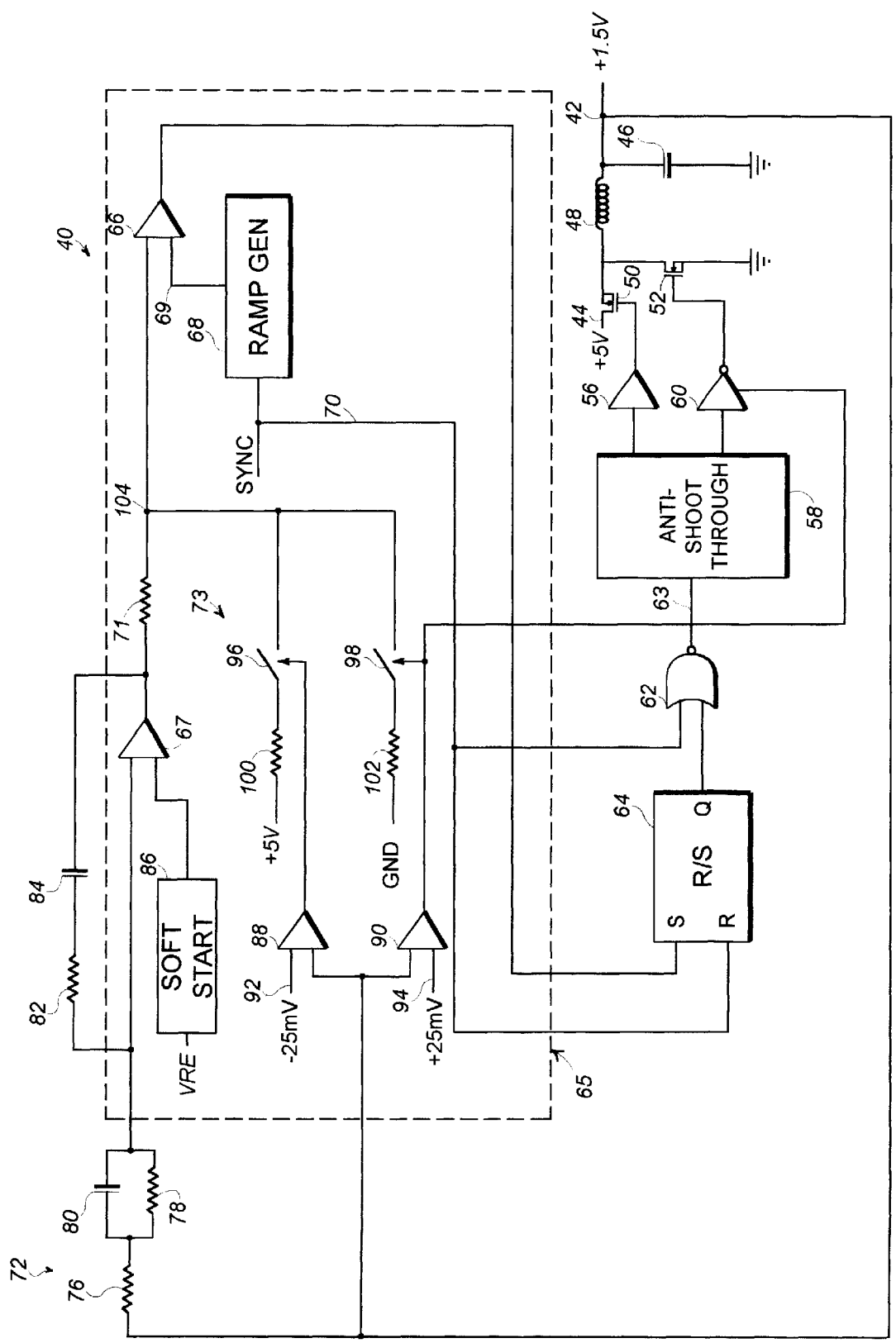
FIG. 2 is a block diagram of a switched power supply having a PWM voltage regulator with a hysteretic loop controller, according to a preferred embodiment of the invention.

With reference now additionally to FIG. 2, details of the power supply and regulator 40 of the invention are shown. The circuit 40 is a switched power supply that provides a regulated output voltage on output line 42 with respect to a supply voltage line 44. The output voltage is maintained on an output capacitor 46 by sourcing a current by a PWM switching operation of FET 50 through an inductor 48 to raise the voltage, or by sinking a current by a complementary PWM switching operation of FET 52 from the inductor 48 to ground to lower the voltage.

The FETs 50 is controlled by an anti-shoot-through circuit 58 via amplifier 56, and the FET 52 is controlled by the anti-shoot-through circuit 58 via inverter 60. The anti-shoot-through circuit 58 is controlled by the output of a NOR gate 62 on line 63. The NOR gate 62 produces a stream of pulses of pulse modulated width controlled by the output of a set-reset (SR) flip-flop (FF) 64 that is connected to a first input of the NOR gate 62. Thus, it can be seen that the longer the pulses produced by the NOR gate 62, the longer FET 50 is held in conduction, and the larger the voltage that is charged onto the capacitor 46. Similarly, the longer FET 52 is held in conduction, and the lower the voltage that is charged onto the capacitor 46.

The set input of the SRFF 64 is controlled by a comparator 66, which has a reference voltage applied on line 104 to its inverting input and a ramp voltage applied to its non-inverting input. The reference voltage, as below described in detail, is derived either from the fed back output voltage on line 42 or from a switching circuit 73 for changing the pulse width modulated pulses to first or second width limits in response to respective changes in the output voltage on line 42 beyond predefined limits. The ramp voltage is generated by a ramp generator 68, which has a pulse stream applied on its input line 70 and is delivered on output line 69. The ramp waveform is illustrated by waveforms 69, the pulse stream is illustrated by waveforms 70, and the reference voltage is illustrated by waveforms 104 in FIGS. 3A–D. (It is noted that like reference numerals are used to denote signal waveforms and the circuit lines or locations from which they are derived.)

The pulses on line 70 are also applied to the reset input of the SRFF 64 and to a second input of the NOR gate 62. Thus, it can be seen that the comparator 66 and the SRFF 64 serve to shape the input signal to the NOR gate 62 to provide pulses of duration on line 63 that are width controlled by the difference between the reference voltage 104 on the inverting input of the comparator 66 and the instantaneous amplitude of the ramp signal 69 generated by the ramp generator 68 with respect to the period of the pulse stream 70 on line 70. In other words, the longer that the instantaneous ramp voltage generated by the ramp generator 68 exceeds the reference voltage, the less time the output Q of the SRFF stays high, and the less time the capacitor 46 is charged. The pulses on line 63 are shown by waveforms 63 in FIGS. 3A–D. Thus, for example, in FIG. 3A, the reference voltage 104 is lower than the reference voltage 104 in FIG. 3B, resulting in shorter pulses 63 at the output of the NOR gate 62.

The inverting input to the comparator 66 is generated by the output from a comparator 67. The comparator 67 receives the output voltage, which is fed back from the output line 42, on its inverting input through a control circuit 72. The output of the comparator 67 is connected through a current limiting resistor 71 to the inverting input of the comparator 66 via line 104. In the normal operation of the circuit 40, therefore, normal variations in the output voltage on line 42 can be easily compensated for by pulse width modulating the pulses applied to the inductance 48 and capacitor 46 in the output circuit.

More particularly, the control circuit 72 receives the fed back output voltage on a resistor 76, which is in series with a resistor 78 that is in parallel with a capacitor 80. The output from the control circuit 72 is connected by a resistor 82 in series with a capacitor 84 to the inverting input of a comparator 67, which is a part of the hysteretic loop controller 65. The output of a soft start voltage controller 86 is applied to the non-inverting input of the comparator 67 to control the voltage applied to the comparator 66 during start-up of the circuit.

The output voltage on line 42 is also applied to two comparators 92 and 94 in the hysteretic loop controller 65. More particularly, the fed back voltage on line 42 is applied to the inverting input of a comparator 88 and to the non-inverting input of a comparator 90. The non-inverting input of the comparator 88 is connected to a negative reference voltage on line 92, and the inverting input of the comparator 90 is connected to a positive reference voltage on line 94. The reference voltages may be of a desired value to define the control range of the hysteretic loop.

Figure 3A:
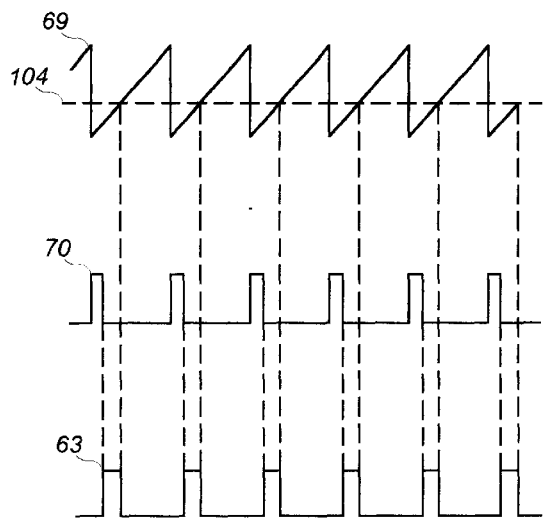
FIGS. 3A–D are a series of waveforms developed at various points in the circuit of FIG. 2, for various circuit conditions, according to a preferred embodiment of the invention.
Figure 3C:
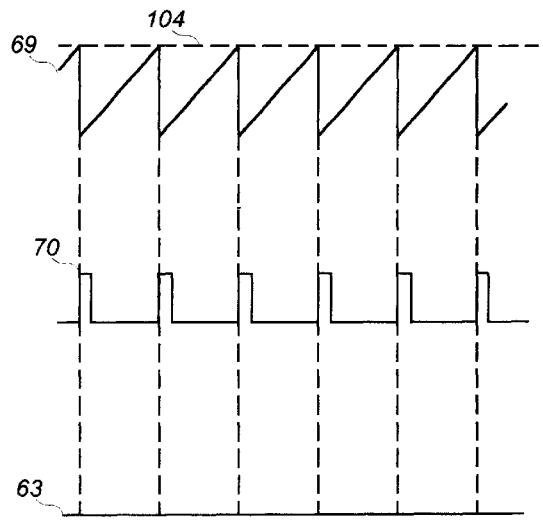
Figure 3B:
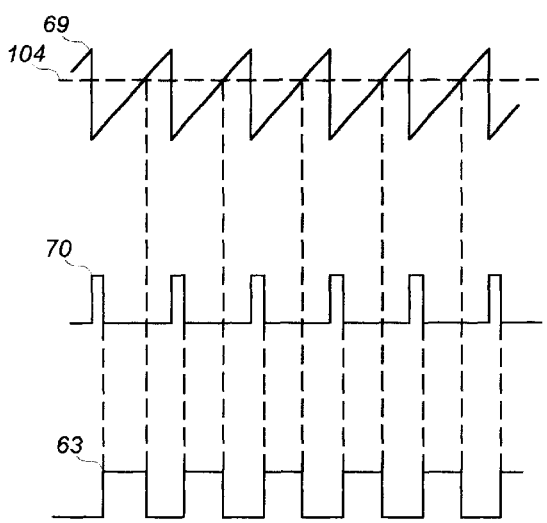

The output of the comparator 88 controls a switch 96 and the output of the comparator 90 controls a switch 98, each connected to switch the inverting input of comparator 66, respectively to a positive voltage and to ground through resistors 100 and 102. Thus, if the output voltage from the circuit on line 42 varies upward from the desired output voltage level by more than the positive reference voltage (sometimes referred to herein as a "maximum voltage limit") that is applied to the comparator 90, the output of comparator 90 changes state to close switch 98. This pulls down line 104 to ground at the inverting input to comparator 66 through the pull-down resistor 102, as shown in FIG. 3C. When line 66 is pulled to ground, a ramp wave of maximum duty cycle is passed through the comparator, resulting in pulses of minimum duty cycle being delivered by the NOR gate 62 to lower the voltage of the output on line 42.

Figure 3D:
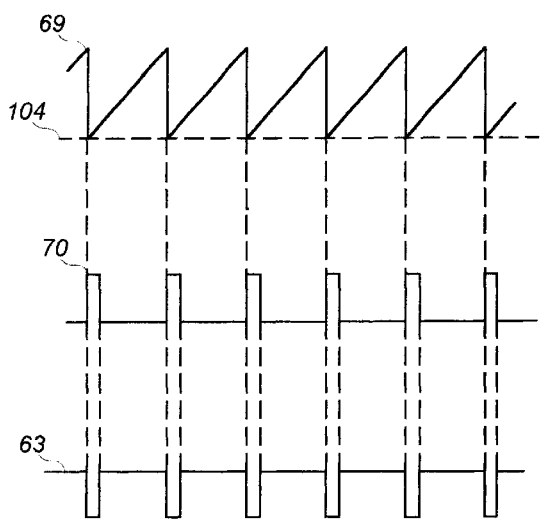

On the other hand, if the output voltage from the circuit on line 42 varies downwardly from the desired output voltage level by more than the negative reference voltage (sometimes referred to herein as a "maximum voltage limit") applied to the comparator 88, the output of comparator 88 changes state to close switch 96. This pulls up line 104 at the inverting input to comparator 66 to a supply voltage value through the pull-up resistor 100, as shown in FIG. 3D. When line 66 is pulled to the supply voltage, a ramp wave of minimum duty cycle is passed through the comparator, resulting in pulses of maximum duty cycle being delivered by the NOR gate 62 to raise the voltage of the output on line 42. In addition, the output from the comparator 90 is connected to control the voltage in the inverter 60. This raises the voltage on the gate of PMOS device 52 to turn it on, which rapidly discharges the capacitor 46 to ground until its voltage level is within the desired operating range.

Thus, it can be seen that the output voltage on line 42 is maintained at its desired value by two mechanisms. The first mechanism is by the ordinary pulse width modulation action of the pulses at the output of the NOR gate 62. The second mechanism occurs if any changes in the output voltage, for example, caused by changes in the load to which the circuit is connected, cause the output voltage to exceed either limit defined by the hysteretic control loop 65. In this event, the duty cycle of the PWM control pulses is rapidly changed to an upper or lower PWM limit, to rapidly bring the output back to the desired level. As an example, in a 5 volt circuit in which the output desired is 1.5 volts on line 42, the voltage values applied on lines 92 and 94 to the comparators 90 and 88 may be, respectively +25 mV and −25 mV, which is about plus and minus 1.7% of the 1.5V quiescent voltage value. If the output voltage, for instance, exceeds 1.525 volts in the positive direction, or 1.475 volts in the negative direction, the limit detection mechanisms of the hysteretic control loop 65 force the output voltage back to the quiescent value as rapidly as possible.

Thus, it can be seen that the circuit and method of the invention provide for duty cycle boost or reduction while a feedback loop is still in control of the output. During the duty cycle boost or reduction, the fundamental switching frequency is continuously maintained.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A switched power supply, comprising:
   a switched circuit for producing an output voltage;
   a circuit for generating pulse width modulated control pulses to control on and off times of said switched circuit to control a magnitude of said output voltage;
   a circuit for changing a width of said pulse width modulated pulses to first or second width limits in response to respective changes of the output voltage of said switched power supply beyond first and second predetermined values;
   wherein said circuit for changing a width of said pulse width modulated pulses comprises:
      a first comparator connected to receive an output voltage of said switched power supply on one input and a first reference voltage on another input, wherein when said output voltage exceeds said first reference voltage, an output of said first comparator changes output state;

a second comparator connected to receive said output voltage on one input and a second reference voltage on another input, wherein when said second reference voltage exceeds said output voltage, an output of said second comparator changes output state; and a circuit for changing said pulse width modulated pulses to said first or second width limits in response to respective changes of output states of said first and second comparators.

2. The switched power supply of claim 1 further comprising a power supply for said switched power supply of about 5 volts, and wherein said first and second reference voltages are respectively +25 mV and −25 mV.

3. A switched power supply, comprising:

a circuit for generating pulse width modulated control pulses to control a output voltage of said switched power supply;

a first comparator connected to receive said output voltage on one input and a first reference voltage on another input, wherein when said output voltage exceeds said first reference voltage, an output of said first comparator changes output state;

a second comparator connected to receive said output voltage on one input and a second reference voltage on another input, wherein when said second reference voltage exceeds said output voltage, an output of said second comparator changes output state;

and a circuit for changing said pulse width modulated pulses to first or second width limits in response to respective changes of output states of said first and second comparators.

4. The switched power supply of claim 3 wherein said circuit for generating pulse width modulated control pulses to control a magnitude of an output of said switched power supply comprises:

a comparator connected to receive on one input a signal indicating a value of an output of said switched power supply;

a ramp wave generator for producing a ramp wave output connected to another input of said comparator;

wherein an output of said comparator is a signal containing a time width proportional to said output of said switched power supply.

5. The switched power supply of claim 3 further comprising a power supply for said switched power supply of about 5 volts, and wherein said first and second reference voltages are respectively +25 mV and −25 mV.

6. A method for operating a switched power supply, comprising:

generating pulse width modulated control pulses to control on and off times of said switched power supply circuit;

and modifying a width of said pulse width modulated control pulses to control a magnitude of said an output voltage of said switched power supply;

changing a width of said pulse width modulated pulses to first or second width limits in response to respective changes of output voltage beyond first and second predetermined values;

said step of changing a width of said pulse width modulated pulses comprises:

comparing said output voltage with a first reference voltage and generating a first control output when said output voltage exceeds said first reference voltage;

comparing said output voltage with a second reference voltage and generating a second control output when said second reference voltage exceeds said output voltage; and changing said pulse width modulated pulses to said first or second width limits in response to respective changes of said first and second control outputs.

7. A method for operating a switched power supply, comprising:

generating pulse width modulated control pulses to control on and off times of said switched power supply circuit;

and modifying a width of said pulse width modulated control pulses to control a magnitude of said an output voltage of said switched power supply;

wherein said generating pulse width modulated control pulses comprises:

comparing said output voltage with a ramp wave to produce a compared waveform when said ramp wave is larger than said output voltage;

and using said compared waveform to provide a signal containing a time width proportional to said output voltage;

wherein said changing a width of said pulse width modulated pulses comprises:

comparing said output voltage with a first reference voltage and generating a first control output when said output voltage exceeds said first reference voltage;

comparing said output voltage with a second reference voltage and generating a second control output when said second reference voltage exceeds said output voltage; and changing said pulse width modulated pulses to said first or second width limits in response to respective changes of said first and second control outputs.

8. A mass data storage device, comprising:

a switched power supply to provide power to an element of said mass data storage device;

said switched power supply including:

a switched circuit for producing an output voltage;

a circuit for generating pulse width modulated control pulses to control on and off times of said switched circuit to control a magnitude of said output voltage;

a circuit for changing a width of said pulse width modulated pulses to first or second width limits in response to respective changes of the output voltage of said switched power supply beyond first and second predetermined values;

wherein said circuit for changing a width of said pulse width modulated pulses comprises:

a first comparator connected to receive an output voltage of said switched power supply on one input and a first reference voltage on another input, wherein when said output voltage exceeds said first reference voltage, an output of said first comparator changes output state;

a second comparator connected to receive said output voltage on one input and a second reference voltage on another input, wherein when said second reference voltage exceeds said output voltage, an output of said second comparator changes output state; and a circuit for changing said pulse width modulated pulses to said first or second width limits in response to respective changes of output states of said first and second comparators.

9. The mass data storage device of claim 8 further comprising a power supply for said switched power supply of about 5 volts, and wherein said first and second reference voltages are respectively +25 mV and −25 mV.

* * * * *